United States Patent [19]

Kilham

[11] Patent Number: 4,977,859
[45] Date of Patent: Dec. 18, 1990

[54] SELECTIVE BIRD FEEDER

[76] Inventor: Peter Kilham, Mill Rd., Foster, R.I. 02825

[21] Appl. No.: 439,236

[22] Filed: Nov. 20, 1989

[51] Int. Cl.$^5$ .............................................. A01K 39/00
[52] U.S. Cl. ................................................... 119/52.2
[58] Field of Search .................... 119/52.2, 52.1, 51.01, 119/53, 57.8, 57; 222/457, 519

[56] References Cited

U.S. PATENT DOCUMENTS

| | | | |
|---|---|---|---|
| 364,557 | 6/1887 | Walin | 119/53 |
| 503,664 | 8/1893 | Jones | 119/53 |
| 609,755 | 8/1898 | Chapin | 119/53 |
| 2,854,949 | 10/1958 | Wiggins | 119/53 |

Primary Examiner—Gene Mancene
Assistant Examiner—R. Thomas Price
Attorney, Agent, or Firm—Robert J. Doherty

[57] ABSTRACT

A feed device for birds in which a feed distribution assembly is mounted at the bottom of a feed container. The distribution assembly includes a downwardly outwardly slanted lower wall which forces seed to the inner outside peripheral surfaces of the assembly against an intermediate wall which includes openings therethrough. Such openings are normally partially aligned with similar openings formed in an encircling band about the intermediate wall which band is adjustably rotatable thereon such that the desire rate of feed distribution is dependent on the species to be attracted and the seed size utilized.

11 Claims, 3 Drawing Sheets

SELECTIVE BIRD FEEDER

BACKGROUND AND OBJECTS OF THE INVENTION

This invention is directed to a bird feeder construction and more particularly with a bird feeder which may selectively increase or decrease the flow of seed therethrough to a feed position for birds.

Desirable features of bird feeders include the ability to effectively distribute different sized feed material, that is, the feeder should be able to be utilized on one hand for the distribution of fine seeds such as thistle seed and be similarly capable for efficient distribution of large, i.e., sunflower, seeds with a minimum of adjustment or modification. Another desirable bird feeder feature is that they may additionally present the feed in a position which is readily accessible for the feeding of birds in a natural position and thus enables the effective use of the device for intended bird species. In addition, this position in which the seed is presented should desirably be one in which a mass or body of seed is held together such that the birds can peck at to dislodge individual seeds such that a more natural way of feeding is simulated, that is, the feeder should be capable of preventing the free flow or scattering of the seed.

Many types of bird feeder constructions are available which provide for one or more of the above such indicated desirable features but none provide such an effective or unique operational manner as the present invention.

Accordingly, the above and other objects of the present invention are accomplished by a feed device for birds including an upper vertically disposed container for the receipt and storage of seed and a seed distribution assembly mounted at said container bottom such that seed from said container may pass therethrough, said assembly including a downwardly outwardly slanted lower wall on which said seed may collect in a pile therein and further including an upstanding circular, peripherally extending combination perch and seed collection tray disposed at the bottom thereof and an intermediate wall extending upright from the outer periphery of said lower wall, said intermediate wall having a plurality of separate circumferentially-spaced feed openings therethrough such that seed from said pile is visible through said intermediate wall, said assembly further including an upright circular band frictionally mounted on the outside of said intermediate wall for limited rotational positioning with respect thereto, said band including a plurality of separate circumferentially-spaced openings such that rotation of said band selectively at least partially blocks some of said feed openings in said intermediate wall and wherein said lower wall openings and said band openings each have laterally-spaced first and second side edges defining the lateral extent of said openings and wherein at least some of said opening side edges are angularly slanted such that superposing a slanted first side edge of said band with a second side edge of said lower wall forms a somewhat triangular limited feed access opening through which birds may pluck seed from said pile.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DETAILED DESCRIPTION OF THE INVENTION

Figure 1:
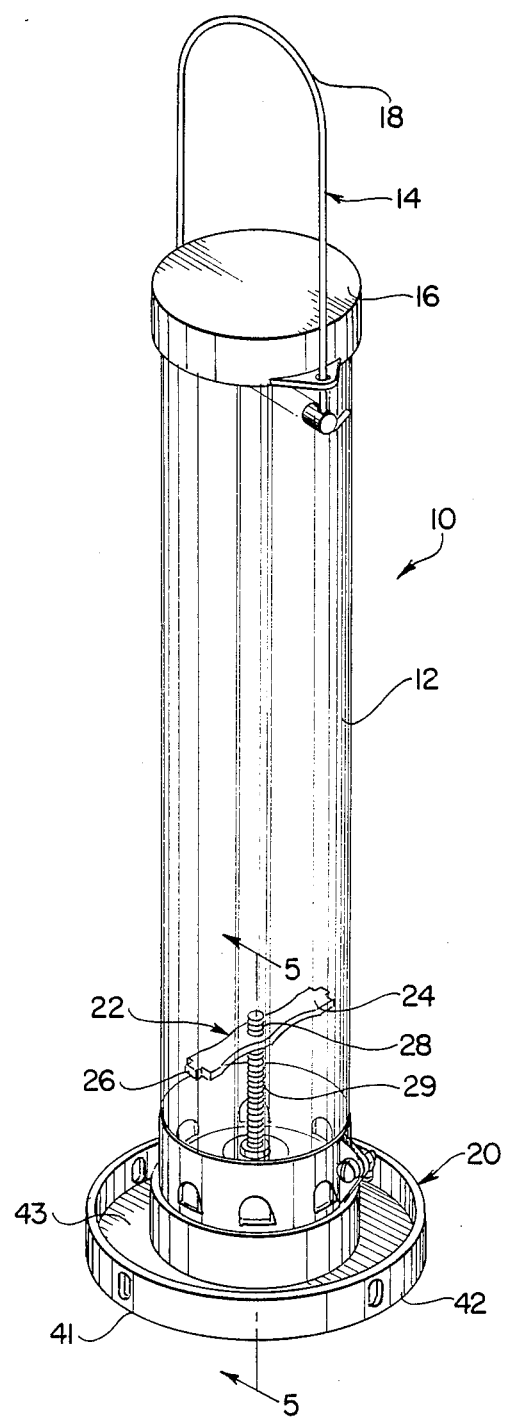
FIG. 1 is a perspective view of a bird feeder construction including the present invention.

Turning now to the drawings and particularly FIG. 1 thereof, the present bird feeder construction 10 is shown. Such feeder device 10 includes a container portion 12 generally of cylindrical configuration and formed from a transparent or semi-transparent material such as butyrate, polycarbonate or the like. The upper container 12 portion is provided with a combination closure and hanging assembly 14 including a cover 16 and a bail 18. The generally open bottom end of the container 12 is provided with a distribution assembly 20. The assembly 20 is supported in the displayed position by mounting means 22 including a laterally extending connecting bar 24 having terminal fingers 26 which extend into slots or openings provided in the container 12 wall. A central portion of the bar 24 includes a threaded opening 28 for receipt of a threaded rod 29 upwardly extending from a base portion of the distribution assembly and in a manner which will hereinafter be more clearly apparent. It should also be pointed out that although the mounting of the assembly 20 is depicted at the bottom of the container portion 12 that such assembly could be mounted at a position intermediate the container portion 12 and that the phrase bottom does not preclude such placement.

Figure 5:
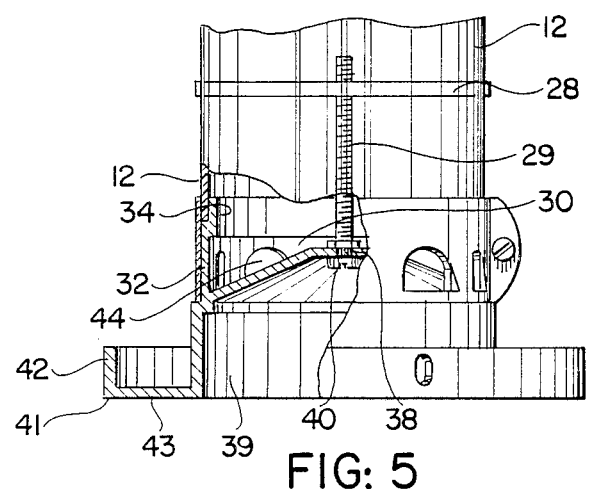
FIG. 5 is a view similar to FIGS. 2 through 4 but partially in section showing the manner in which the seed distribution assembly of the present invention is particularly supported from the remaining portions of the bird feeder device.

The distribution assembly 20 includes a lower wall 30 on which seed stored in the container portion 12 is adapted to rest. Because of the downward outward radial slope of the wall 30, seed collects thereon in a generally conical pile and further forces the seed to the outer peripheral portions of the distribution assembly. The assembly further includes an upright intermediate wall 32 which is essence surrounds the lower peripheral surface of the lower wall 30. The intermediate wall 32 upper terminal portion includes a radially inward offset portion 34 which is adapted to slidingly receive the container 12 lower terminal portions which in turn rest upon a ledge 36 formed thereby. Also as best seen in the FIG. 5 drawing, the bolt or other threaded member 29 extends through a central opening 38 in the lower wall 30 and may be firmly positioned in the depicted manner by tightening the bolt head 40 positioned beneath the lower wall 30.

Generally the lower wall 30 is part of an overall stamping 39 which includes at the lower peripheral portions thereof a combination perch and seed receiving tray 41. Certainly, however, this part or element 39 may alternatively be made by casting or stamping and is preferably formed of aluminum, stainless steel or some other lightweight metal alloy but certainly includes the use of plastic resins as well. The tray 41 includes an upright peripheral perch portion 42 and a shallow generally U-shaped tray portion 43 for receiving seed which may fall there as birds feed from the device.

The intermediate wall portion 34 is provided with a plurality of circumferentially-spaced openings 44. These openings 44 include a generally straight or flat bottom edge 45 which preferably coincides with or in essence forms a continuation of the lower wall 30 such that seed diverted from the container 12 by reason of the lower wall is presented to such openings. This configuration is particularly desirable since it reduces or eliminates the build up of dust or sediment which can clog openings which are otherwise spaced above the lower feed wall and facilitates the cleaning of the device as well. Additionally, the openings 44 upwardly extend to a top wall 46 and are preferably in a generally inverted U shape configuration although certainly other configurations are contemplated. These wall openings 44 also include laterally spaced first and second side edges 47 and 48 respectively.

The distribution assembly 20 further includes a band 50 preferably formed from an integral metal strip which terminates in tabs 52 adapted to abut each other and through which a screw of other fastening means 54 is adapted to extend through openings such that the circular band may be frictionally positioned about the device 10 lower end and particularly surrounding the intermediate wall portion 34. The band 50 is further provided with openings 56. The openings 56 generally correspond to the shape of the openings 44 and include first and second side edges 57 and 58 respectively.

Figure 2:
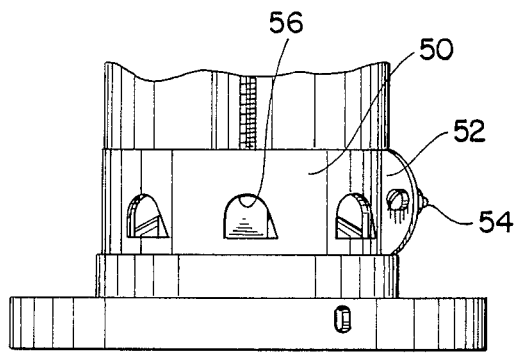
FIGS. 2 through 4 are partial views of the bird feeder bottom shown in FIG. 1 wherein a portion of the distribution assembly thereof, namely, the rotatable band, is positioned in various positions with respect to the remaining bird feeder portions.
Figure 3:
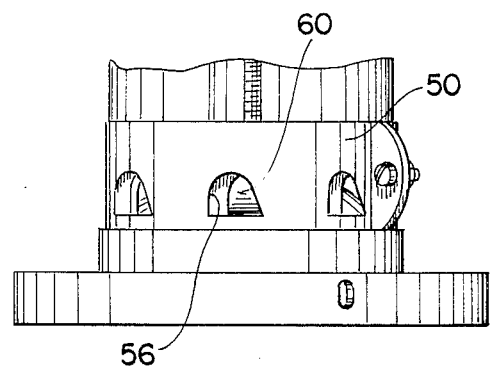
Figure 4:
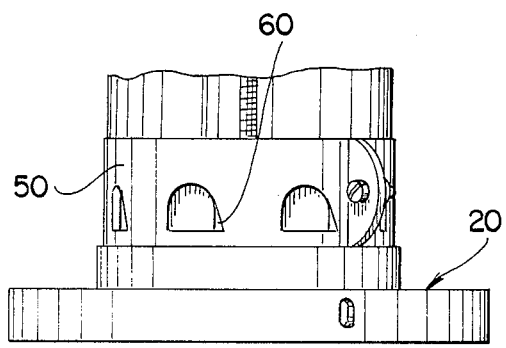
Figure 7:
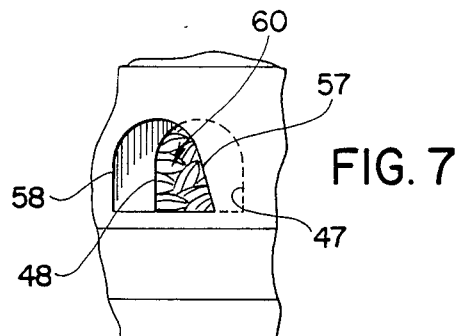
FIGS. 7 and 8 are enlarged views showing the manner in which the seed opening can be varied from large to small respectively.
Figure 8:
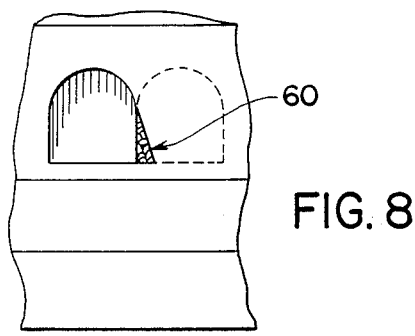
Figure 9:
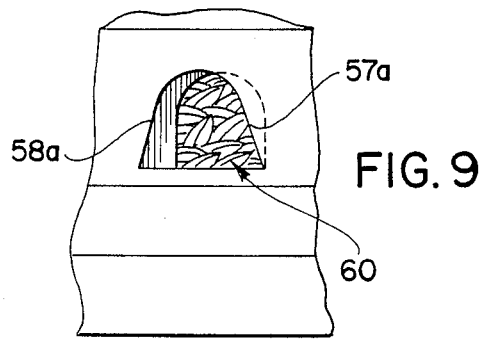
FIG. 9 is a view similar to FIG. 7 showing an alternate form of the invention.
Figure 6:
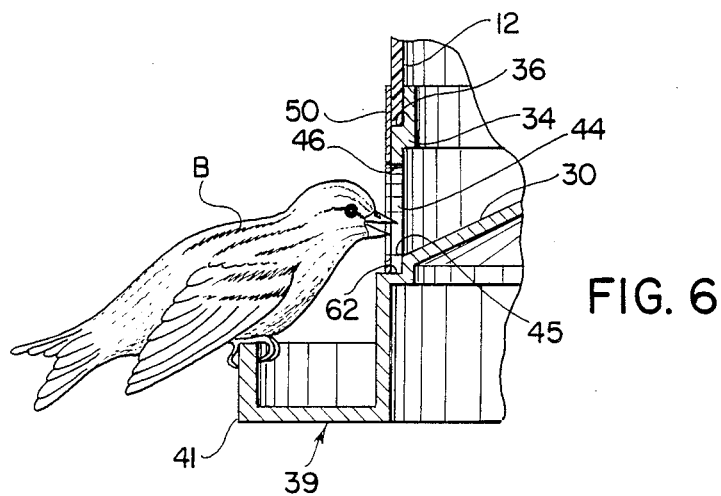
FIG. 6 is an enlarged sectional portion of FIG. 5 and shows particularly the manner in which the various seed distribution assembly parts relate to each other.

As the drawings illustrate, it may be apparent the band as particularly shown in FIGS. 2, 3 and 4 and in FIGS. 7, 8, and 9 can be variously positioned vis-a-vis the intermediate wall portion 34.

For instance, the openings 56 and 44 may be somewhat fully aligned as shown in FIGS. 2 and 9 such that full or nearly full seed accessibility is achieved. Alternatively, the openings 56 and 44 may be aligned so that only a minor portion of opening 44 remains accessible through opening 56 such that partial seed accessibility is achieved. Such minor effective opening is achieved. Such minor effective opening is shown in FIGS. 4 and 8. An increased amount of partial seed accessibility can be achieved by moving band 50 to the slightly larger effective openings shown by FIGS. 3 and 7. The openings 56 can, of course, be completed misaligned with the openings 44 such that feed access is totally blocked. It should also be pointed out the lower wall 30 extends a short distance to in effect form a ledge 62 on which both the band 50 and the intermediate wall 34 are adapted to rest. In addition, the entire seed distribution assembly 20 is simply held to the bottom of container 12 by the action of the rod 29. Thus tightening of the rod via head 40 forces the container 12 down against the ledge 36 via the bar 28. This in turn forces the intermediate wall 34, assuming it is a separate part, against the ledge 62 of the lower wall 30. In addition, the band 50 also is adapted to rest on the ledge 62 and extends preferably above the bottom of the lower edge of the container 12. When tightened, the band thus further serves to hold the container in round since these plastic tube-type structures often tend to be out of round. The positioning of the band 50 on the ledge 62 also enables the bottom of the openings 56 with the openings 44 to be aligned so as to eliminate seed dust, etc. from building up.

As previously stated, one of the key features of this structure is its ability to hold back the seed from freely flowing through the openings 44 and while the size of the openings 44 are such that large seed (sunflower, etc.) would bridge across the opening 44 behind the intermediate wall 34 and be presented to birds for the desired pecking removal. Smaller seed, however, requires a correspondigly smaller effective opening (that is, the visible opening 60 when a band opening 56 is partially superposed over an intermediate wall opening 44) to achieve this bridging effect so that the seed is presented to the perching bird in the aforementioned desired feeding manner. To achieve this ability to vary the effective or visible feed opening, at least one of the side edges of the openings 44 or 56 are downwardly laterally slanted such that full or partial superposing this slanted edge with an opening achieves a visible or effective feed opening 60 of somewhat triangular configuration. This triangular configuration has been found to be particularly effective in achieving the desired seed bridging effect in a wide variety of seed types and seed sizes. Of course, the slanted side edge could be placed on both sides of the opening 56 such as shown by 57a and 58a in FIG. 9. Similarly, the slanted side edge could be located in the intermediate wall, that is, forming a part of openings 44, and could also be inwardly slanted (that is, to the left) rather than outwardly (that is, to the right as shown in the drawings). Similarly, the slanted side edge could be partially curved such that visible openings of ovate or crescent shapes are formed, the term "slanted" being intended to cover such abovementioned alternatives to these configurations specifically illustrated.

Operation of the above assembly is simply achieved by loosening the band 50 through the screw means, then rotationally adjusting the band vis-a-vis the container 12 such that the desired alignment of openings 56, 44 is achieved such as the sample illustrations shown in FIGS. 7-9, and then the screw means tightened such that the desired alignment is retained.

Turning now to FIGS. 7 and 9 particularly, the manner in which the seed is available through the respective openings provided in the intermediate wall 32 and the band 50 is illustrated. Therein a bird B perched upon the flange wall or perch 42 can extends its beak through the effective openings 60 should the openings 56 be aligned or superposed with the openings 44. Similarly if it is desired to attract very small birds such as those that feed on fine seed such as thistle seed, the container is appropriately loaded with such seed and band 50 positioned such that the effective feed openings 60 are very small thus restricting seed flow as is appropriate for finer seed.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A feed device for birds including an upper vertically disposed cylindrical container having upper and lower ends for the receipt and storage of seed and a closure assembly mounted at said container lower end such that seed from said container passes therethrough, said assembly including a downwardly outwardly slanted lower wall on which said seed may collect in a pile therein and further including an upstanding circular, peripherally extending combination perch and seed collection tray disposed at the bottom thereof, said lower wall having an outer periphery and an intermediate wall extending upright from said outer periphery of said lower wall, said intermediate wall having a plurality of separate circumferentially-spaced feed openings therethrough such that seed from said pile is visible through said intermediate wall, said assembly further including an upright circular band frictionally mounted on the outside of said intermediate wall said band rotationally movable with respect to said intermediate wall, said band including a plurality of separate circumferentially-spaced openings such that selective rotation of said band partially blocks some of said feed openings in said intermediate wall and wherein said intermediate wall openings and said band openings each have laterally-spaced first and second side edges defining the lateral extent of said openings and wherein at least some of said opening side edges are angularly slanted such that superposing a slanted first side edge of said band with a second side edge of said lower wall forms a somewhat triangular limited feed access opening through which birds may pluck seed from said pile.

2. The feed device of claim 1, wherein the slanted first edge is formed in intermediate wall opening.

3. The feed device of claim 1, wherein said intermediate wall openings are of flat bottom configuration.

4. The feed device of claim 1, wherein said intermediate wall openings are generally inverted U-shaped.

5. The feed device of claim 4, wherein said band openings are generally inverted U-shaped with the first side edges thereof downwardly laterally slanted.

6. The feed device of claim 5, wherein the second side edges of said band openings are also downwardly laterally slanted.

7. The feed device of claim 2, wherein said band openings are generally inverted U-shaped.

8. The feed device of claim 7, wherein said intermediate wall openings are generally inverted U-shaped with the first side edges thereof downwardly laterally slanted.

9. The feed device of claim 1, said bottom wall radially extending beyond said intermediate wall to form a ledge on which said band is adapted to be supported.

10. The feed device of claim 1, said band being an easily replaceable integral metal band having opposed ends in turn provided with means for receiving screw means for alternatively tightening or loosening said band with respect to said intermediate wall.

11. The feed device of claim 1, said intermediate wall inwardly spaced from portions of said perch and seed collection tray.

* * * * *